US012809645B2

(12) United States Patent
Hirano

(10) Patent No.: US 12,809,645 B2
(45) Date of Patent: Nov. 24, 2026

(54) VEHICLE PERSONALIZATION SETTING SYSTEM AND VEHICLE PERSONALIZATION SETTING METHOD

(71) Applicant: DENSO CORPORATION, Kariya-city (JP)

(72) Inventor: Chihiro Hirano, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 105 days.

(21) Appl. No.: 18/898,980

(22) Filed: Sep. 27, 2024

(65) Prior Publication Data

US 2025/0021349 A1 Jan. 16, 2025

Related U.S. Application Data

(63) Continuation of application No. PCT/JP2023/009863, filed on Mar. 14, 2023.

(30) Foreign Application Priority Data

Mar. 30, 2022 (JP) ................................ 2022-056199

(51) Int. Cl.

*G06F 1/24* (2006.01)
*G06F 9/448* (2018.01)
*G06F 9/4401* (2018.01)
*G06V 20/59* (2022.01)
*G06V 40/10* (2022.01)

(52) U.S. Cl.

CPC ............ *G06F 9/448* (2018.02); *G06F 9/4411* (2013.01); *G06V 20/59* (2022.01); *G06V 40/10* (2022.01)

(58) Field of Classification Search

CPC ........ G06F 9/448; G06V 20/59; G06V 40/10; B60R 16/037; B60R 25/24; G06Q 50/10
USPC .......................................................... 713/100
See application file for complete search history.

(56) References Cited

U.S. PATENT DOCUMENTS

2003/0033601 A1 2/2003 Sakata et al.
2004/0078270 A1 4/2004 Arakawa
2005/0165639 A1* 7/2005 Ross .................. G06Q 30/0267 707/E17.109
2010/0233957 A1* 9/2010 Dobosz .................... G07C 9/28 455/41.1

(Continued)

FOREIGN PATENT DOCUMENTS

JP 2004145480 A 5/2004
WO WO-2002013028 A1 2/2002

OTHER PUBLICATIONS

U.S. Appl. No. 18/898,865, filed Sep. 27, 2024, Hirano.

*Primary Examiner* — Volvick Derose
(74) *Attorney, Agent, or Firm* — Harness, Dickey & Pierce, P.L.C.

(57) ABSTRACT

A vehicle personalization setting system or a vehicle personalization setting sets personalization setting information for at least one vehicle instrument for each of at least one individual recognized by an individual recognition unit, acquires, from an outside of a vehicle, the personalization setting information, stores the personalization setting information of the at least one vehicle instrument mounted in the vehicle, wherein the personalization setting information was previously set, and reads and sets the personalization setting information stored in the storage in the vehicle.

6 Claims, 9 Drawing Sheets

(56) References Cited

U.S. PATENT DOCUMENTS

| | | | | |
|---|---|---|---|---|
| 2013/0144462 | A1* | 6/2013 | Ricci | G08C 19/00 701/1 |
| 2016/0066013 | A1* | 3/2016 | Li | H04N 21/2541 725/75 |
| 2017/0004560 | A1* | 1/2017 | Rackley | G06Q 30/0631 |
| 2020/0050212 | A1* | 2/2020 | Mimura | B60W 30/0956 |
| 2021/0094492 | A1* | 4/2021 | Zender | G06V 40/70 |
| 2021/0291790 | A1* | 9/2021 | Morosawa | G06V 40/173 |
| 2022/0144139 | A1* | 5/2022 | Meyer | B60N 2/02246 |

* cited by examiner

VEHICLE PERSONALIZATION SETTING SYSTEM AND VEHICLE PERSONALIZATION SETTING METHOD

CROSS REFERENCE TO RELATED APPLICATIONS

The present application is a continuation application of International Patent Application No. PCT/JP2023/009863 filed on Mar. 14, 2023, which designated the U.S. and claims the benefit of priority from Japanese Patent Application No. 2022-056199 filed on Mar. 30, 2022. The entire disclosures of all of the above applications are incorporated herein by reference.

TECHNICAL FIELD

The present disclosure relates to a vehicle personalization setting system and a vehicle personalization setting method.

BACKGROUND

A personalization function is a function that manages personalization setting information, such as changing setting values of various vehicle items for each individual and subscriptions (hereinafter referred to as "subs") to functions used by vehicle equipment device. For example, a vehicle audio instrument or the like is installed in the vehicle as the vehicle instrument, and the subscription service for music distribution applied by this vehicle audio instrument may be set by the personalization function.

The currently proposed personalization function recognizes a situation where the driver is currently driving and then changes various settings for each such recognized driver. As first and second comparative examples, a function of setting an expiration date of a function has been known. For example, according to the first comparative example, there is provided a technology for performing processing for charging a seller a calculated fee. For example, expiration date information indicating an expiration date is transmitted to a terminal device, the expiration date is compared with the current time. When a time corresponding to the expiration date is after the current time, the execution of communication is prohibited.

SUMMARY

A vehicle personalization setting system or a vehicle personalization setting sets personalization setting information for at least one vehicle instrument for each of at least one individual recognized by an individual recognition unit, acquires, from an outside of a vehicle, the personalization setting information, stores the personalization setting information of the at least one vehicle instrument mounted in the vehicle, wherein the personalization setting information was previously set, and reads and sets the personalization setting information stored in the storage in the vehicle.

BRIEF DESCRIPTION OF THE DRAWINGS

The above and other features of the present disclosure will become more apparent from the following detailed description made with reference to the accompanying drawings. In the drawings.

DETAILED DESCRIPTION

Figure 1:
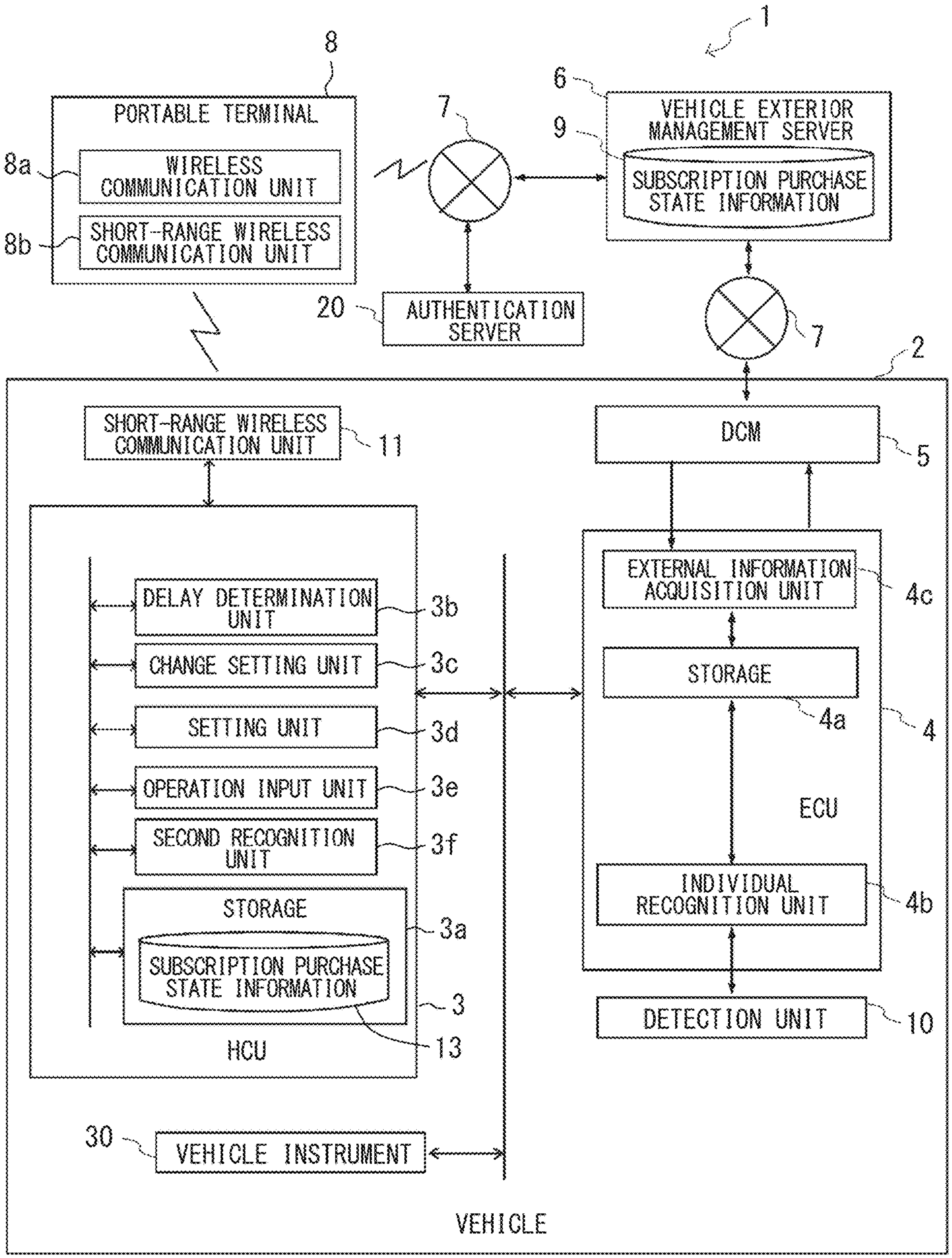
FIG. 1 is a diagram showing a configuration of a personalization setting system according to a first embodiment.

Due to various circumstances such as deterioration of the communication environment, there are cases in which the setting reflection of the personalization setting information is delayed when the personalization setting information cannot be obtained from the external server. For example, it takes a long time to acquire management information when personalization setting information for each individual is managed by an external server of the vehicle instead of the local side of the vehicle. Time consumption and disadvantageous to users may occur when changing personalization setting information or activating the personalization setting function.

One example of the present disclosure provides a vehicle personalization setting system and a vehicle personalization setting method that enable a user to use a personalization setting function of a vehicle instrument as quickly as possible, even when the personalization setting information cannot be acquired from the outside of the vehicle.

According to one example embodiment, a vehicle personalization setting system sets personalization setting information for at least one vehicle instrument for each of at least one individual recognized by an individual recognition unit. An external information acquisition unit acquires, from the outside of the vehicle, the personalization setting information of the vehicle instrument for each individual, the information being stored in an outside based on the recognized individual. A storage stores the personalization setting information of the vehicle instrument mounted in the vehicle, wherein the personalization setting information has been set.

According to one example embodiment, a setting unit reads and sets the personalization setting information stored in the storage in the vehicle, until the personalization setting information stored in the outside the vehicle is acquired. Therefore, it becomes possible to set the individual personalization setting information stored in the storage. Thereby, even when the personalization setting information cannot be acquired from the external server, the user is possible to use the personalization setting function of the vehicle instrument as quickly as possible.

Hereinafter, some embodiments of a vehicle personalization setting system 1 are described with reference to the drawings. In each of the embodiments described below, the same or similar reference numerals are used to designate the same or similar configurations, and a description thereof will be omitted as necessary.

First Embodiment

A first embodiment will be described with reference to FIGS. 1 to 4. The vehicle personalization setting system 1 shown in FIG. 1 includes an HCU 3 installed inside a vehicle 2 and an ECU 4 for individual recognition with network connection, as well as a vehicle exterior management server 6 outside the vehicle 2.

A user boarding the vehicle 2 has a portable terminal 8 such as a smartphone, tablet, or laptop computer. The portable terminal 8 is a terminal that is carried by the user and can be brought into the vehicle interior, is equipped with an interface for operation input, a display, and the like, and is capable of various types of operation input and notification processing. The portable terminal 8 includes a microcontroller equipped with a processor, memory, and I/O, and the like, a wireless communication unit 8*a* for wireless communication with the vehicle exterior management server 6 or the like through a communication network 7, and a short-range wireless communication unit 8*b* for short-range communication with a short-range wireless communication unit 11 using a wireless LAN such as WiFi (registered trademark) or short-range communication technology such as Bluetooth (registered trademark). This portable terminal 8 also constitutes the system 1.

The HCU3, ECU4, vehicle exterior management server 6, and portable terminal 8 inside and outside the vehicle 2 can be connected through the communication network 7. Thereby, the system 1 is constituted. The communication network 7 is based on wired communication networks, wireless communication networks, or the like.

A vehicle application program is installed in a memory of the portable terminal 8. By executing the vehicle application, the portable terminal 8 can give control instructions related to the vehicle 2 from the user and acquire information about the vehicle 2 from the HCU3 or ECU4 of vehicle 2. At this time, the user can set the personalization setting information related to a vehicle instrument 30 by operating the portable terminal 8. The vehicle instrument 30 here includes, but is not limited to, vehicle audio instrument.

The vehicle exterior management server 6 stores subscription purchase state information in a database 9 as the above-described personalization setting information. For example, when the user inputs the subscription purchase state information from the portable terminal 8 to the vehicle exterior management server 6 through the communication network 7, the vehicle exterior management server 6 inputs that subscription purchase state information, stores it in the database 9, and updates it as needed.

The database 9 stores the subscription purchase state information for each individual of a number of users, associates it with their personal information, for example, name and its identification number. The subscription purchase state information indicates a purchase state of a subscription service for each individual, including function purchase information for various functions purchased or borrowed by the individual and expiration date information indicating the expiration date of the function.

The subscription services can include music subscription services for the vehicle audio instrument, video subscription services to enable display in center information, and the like. When the user has the portable terminal 8 such as a smartphone or a personal computer, the user can enter the predetermined personal information into a form or the like provided by a management provider of the above-described vehicle exterior management server 6 through the communication network 7 from the above device. When the user accepts contract matters, the user can conclude a contract with a subscription provider. The subscription service purchase or lease contract can be concluded with an expiration date.

When the user purchases services or signs the lease contract for subscription services related to the vehicle instrument 30 via the portable terminal 8, the subscription purchase state information related to the subscription service is registered in association with the user in the database 9 of the vehicle exterior management server 6 through the communication network 7. The subscription purchase state information is the individual's identification information, billing information, and expiration date information, and is stored in the database 9.

In the present embodiment, this type of personalization function is applied to the subscription function, but is not limited to this. The subscription purchase state information is shown as personalization setting information for this application, but is not limited to this. For example, the personalization setting information is not limited to information about subscription services, but can be applied to personalization setting information for each individual inside the vehicle 2, for example, personalized temperature setting information for an air conditioning system in the vehicle, personalized preference information for music and TV, and the like.

The individual recognition ECU 4 includes a processor such as an MCU core, a storage 4*a*, I/O, and a bus connecting them, and executes various processes by running the control program stored in the storage 4*a*. The MPU is an abbreviation for Micro Processing Unit. The storage 4*a* is a non-transitory tangible storage medium that non-transiently stores computer-readable programs and data. The non-transitory tangible storage medium may be implemented by a semiconductor memory or the like.

The individual recognition ECU 4 includes a detection unit 10 in a connected manner and functions as an individual recognition unit 4*b* that identifies individuals who have boarded the vehicle 2. The detection unit 10 detects the state of the inside and outside of vehicle 2 and the state of the user in vehicle 2. The detection unit 10 includes various sensors or switches, and detects the state of the vehicle 2 or the user using a detection state of sensors or a switch state as parameters.

The detection unit 10 can be a remote sensor that accepts door lock locking/unlocking instructions and remote engine start from smart keys and other devices, a door lock switch that locks/unlocks the door, a door lock sensor that operates the door lock switch from inside the vehicle, a door sensor that detects whether a vehicle door is open or closed, and a seat sensor that detects whether a user is seated on an in-vehicle seat, a seat belt sensor that detects whether the user is wearing a seat belt, and a seat position sensor that detects the front/rear position of the in-vehicle seat, a shift position sensor that detects shift range, switch for angle adjustment of door mirror, a sensors and a switch for con-light or auto-light, and a steering sensor that detects whether a steering wheel is steered by a user.

Also, the detection unit 10 can be an ignition or power switch that starts/stops an engine or controls an electrical system, a vehicle speed sensor that detects the speed of the vehicle 2, an air conditioner switch that instructs the cabin temperature setting and blower environment of the air conditioner, a parking brake sensor that detects the status of the parking brake, a sensor or electronic throttle sensor for detecting pressing of an accelerator pedal, a brake pedal stroke sensor, a brake pedal position sensor, a touch panel mounted on a surface of the CID that enables operation of infotainment applications, a front view camera, a side view camera, a corner view camera, a rear view camera, an electronic mirror, a laser radar using LiDaR, millimeter-wave radar sensors for peripheral monitoring to monitor an area in a periphery of the vehicle 2, and the like.

The detection unit 10 can also detect the user state by using an occupant monitor. The occupant monitor detects the state of the occupant in the vehicle 2 or the operation state of various operating devices. The occupant monitor includes a camera that detects the state of the occupant in the driver seat, front passenger seat or rear seat by using an image sensor to capture the state of the occupant and outputs an imaging signal. The occupant state monitor of the driver is referred to as DSM. The DSM is an abbreviation for driver status monitor.

The individual recognition ECU 4 is connected to the HCU 3 and other ECUs not shown in the figure through a network or other means of communication. Thereby, coordinated control of vehicle 2 is implemented as a whole. The ECU 4 connects to an external communication network 7 through a DCM 5. The DCM5 is an abbreviation for Data Communication Module and indicates a module for mediating and communicating with devices inside and outside the vehicle.

The ECU 4 executes the program stored in the storage **4*a* to implement the function as individual recognition unit 4*b* that recognizes individuals based on the detection information of detection unit 10. Further, the ECU 4 executes a program stored in the storage 4*a* to implement a function as external information acquisition unit 4*c* that enables acquisition of the subscription purchase state information for each individual that is stored externally based on the individual recognized by individual recognition unit 4*b***.

The HCU 3 also constitutes the ECU for the display operation interface system. The HCU is an abbreviation for Human Machine Interface Control Unit. The HCU3 also includes a processor, a storage **3*a*, I/O, and a bus connecting them, and executes various controls by running programs stored in the storage 3*a*. The storage 3*a* is a non-transitory tangible storage medium that non-transiently stores computer-readable programs and data. The non-transitory tangible storage medium may be implemented by a semiconductor memory or the like. A database 13 in which the subscription purchase state information is sequentially updated is constructed in the storage 3*a***.

The storage **3*a* stores in the database 13 the subscription purchase state information of the vehicle instrument 30 set up inside the vehicle 2 and set up in the past (in other words, previously set). When the user operates the operation input unit 3*e* connected to the HCU3 to set customized subscription purchase state information of the vehicle instrument 30 built into vehicle 2, the HCU3 inputs the subscription purchase state information and stores it in the database 13 in the storage 3*a*** and updates it as needed.

Incidentally, the subscription purchase state information stored by the vehicle exterior management server 6 in the database 9 and the subscription purchase state information stored in the database 13 of the storage **3*a* of the HCU 3 inside the vehicle 2 are periodically (for example, every few days, every month) updated by communication between the HCU 3 and the vehicle exterior management server 6 via the ECU 4 and the DCM 5 when the communication status by the DCM 5 is preferable in a preferable communication environment. Thereby, it is possible to hold a copy of the subscription purchase state information in the database 13 of the storage 3*a* of the HCU 3**.

In addition, when the HCU 3 acquires the individual identification result by the individual recognition unit **4*b* from the individual recognition ECU 4, it is used as identification information for selecting the subscription purchase state information held in the storage 3*a***.

By executing the program stored in the storage **3*a*, the HCU 3 implements a function as a delay determination unit 3*b* for determining the delay situation of recognition of an individual by the individual recognition unit 4*b*. In addition, by executing the program stored in the storage 3*a*, the HCU 3 implements a function as a change setting unit 3*c* that changes and sets the contents of the acquisition of the subscription purchase state information acquired from the outside by the external information acquisition unit 4*c* in response to the delay situation of the recognition of the individual by the delay determination unit 3*b***.

Also, when the individual is identified by the individual recognition unit **4*b*, the HCU 3 checks the individual against the individual according to the subscription purchase state information acquired from the outside. When the individual is checked, the HCU 3 implements a function as a setting unit 3*d* that sets the subscription purchase state information of the vehicle instrument 30 of the checked individual. The HCU 3 is connected to the short-range wireless communication unit 11, which enables communication with the short-range wireless communication unit 8*b* of the portable terminal 8 by means of the short-range wireless communication unit 11**.

Figure 2:
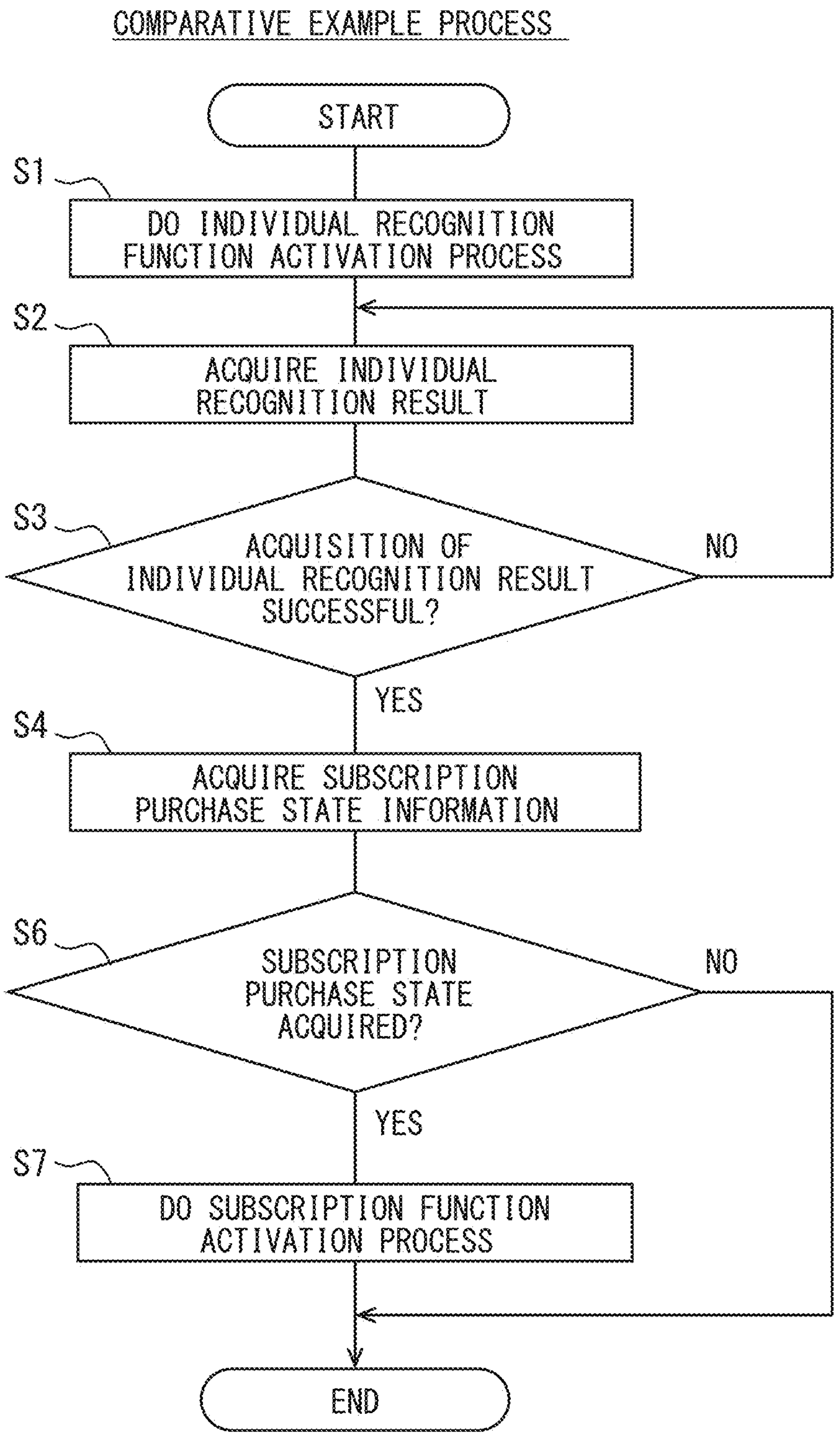
FIG. 2 is a flowchart schematically illustrating a first part of a process content in a vehicle.

The characteristic action effect of the present embodiment will be described with respect to the above basic structure. FIG. 2 shows a normal flow. The HCU 3 executes the process shown in FIG. 2 at a predetermined timing to reflect the subscription purchase state information in the vehicle instrument 30. For example, it is desirable to execute the process immediately after activation by the power switch of the vehicle 2.

When the user turns on the ignition or power switch, the HCU 3, ECU4, and DCM 5, and the like are activated. After this, the ECU 4 processes the activation of the individual recognition function by the individual recognition unit **4*b* in S1 to recognize the user seated in the seat of vehicle 2. When the user is recognized by the function of the individual recognition unit 4*b*, the ECU 4 acquires the recognition result of the individual in S2, and repeats this individual recognition process in S2 until the individual recognition result is successfully acquired in S3**.

When the ECU 4 successfully acquires the individual recognition result in S2, the determination result is YES in S3 and the subscription purchase state information from the vehicle exterior management server 6 in S4. Then, when the subscription purchase state information is acquired, the subscription service can be enabled in S6 by processing the activation of the subscription function.

Thereby, the user is possible to enjoy various subscription-distributed services, such as music distribution services, for example, in the vehicle 2. When the subscription purchase state information cannot be acquired from the vehicle exterior management server 6 in S6, the determination result is NO in S6 and the process ends without activating the subscription function.

However, the individual recognition process may be repeated several times in S2 and S3, for example, when the individual recognition unit **4*b*** performs the check using the image recognition and the result indicates no matching with the preregistered user. Therefore, it is desirable to improve the processing details as follows.

Figure 3:
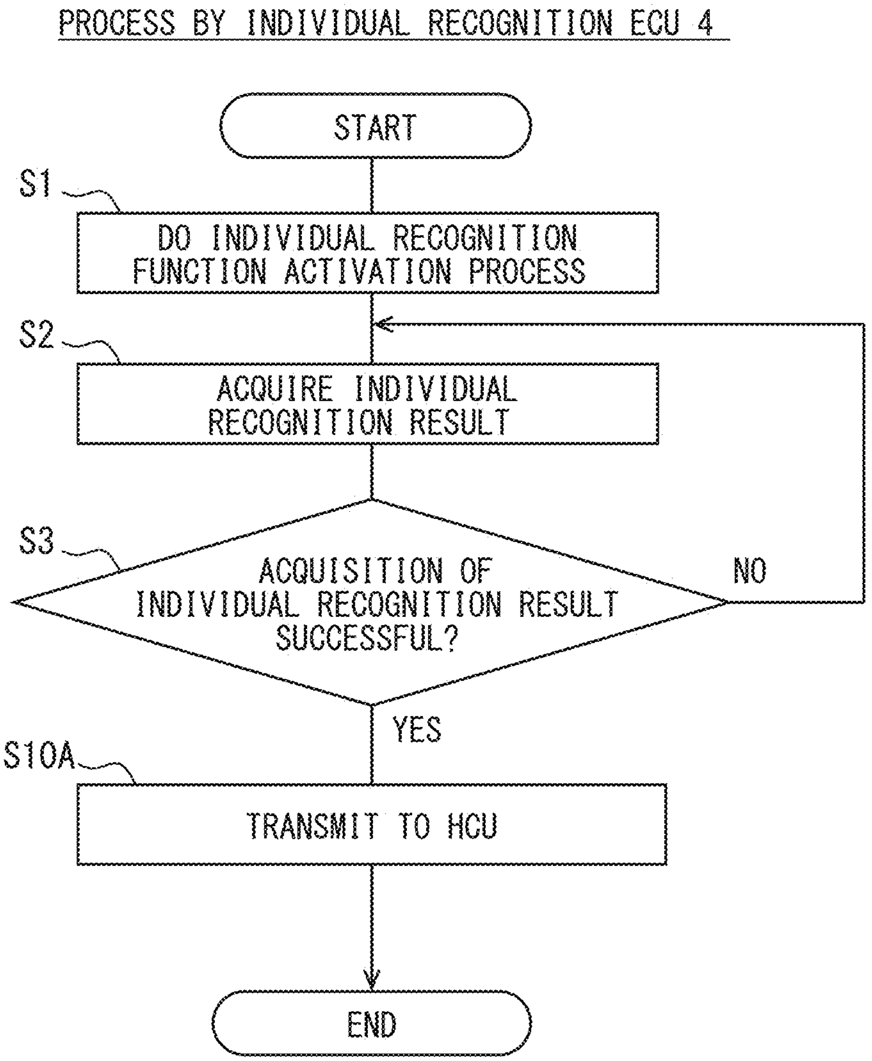
FIG. 3 is a flowchart schematically illustrating a second part of the process content in the vehicle.
Figure 4:
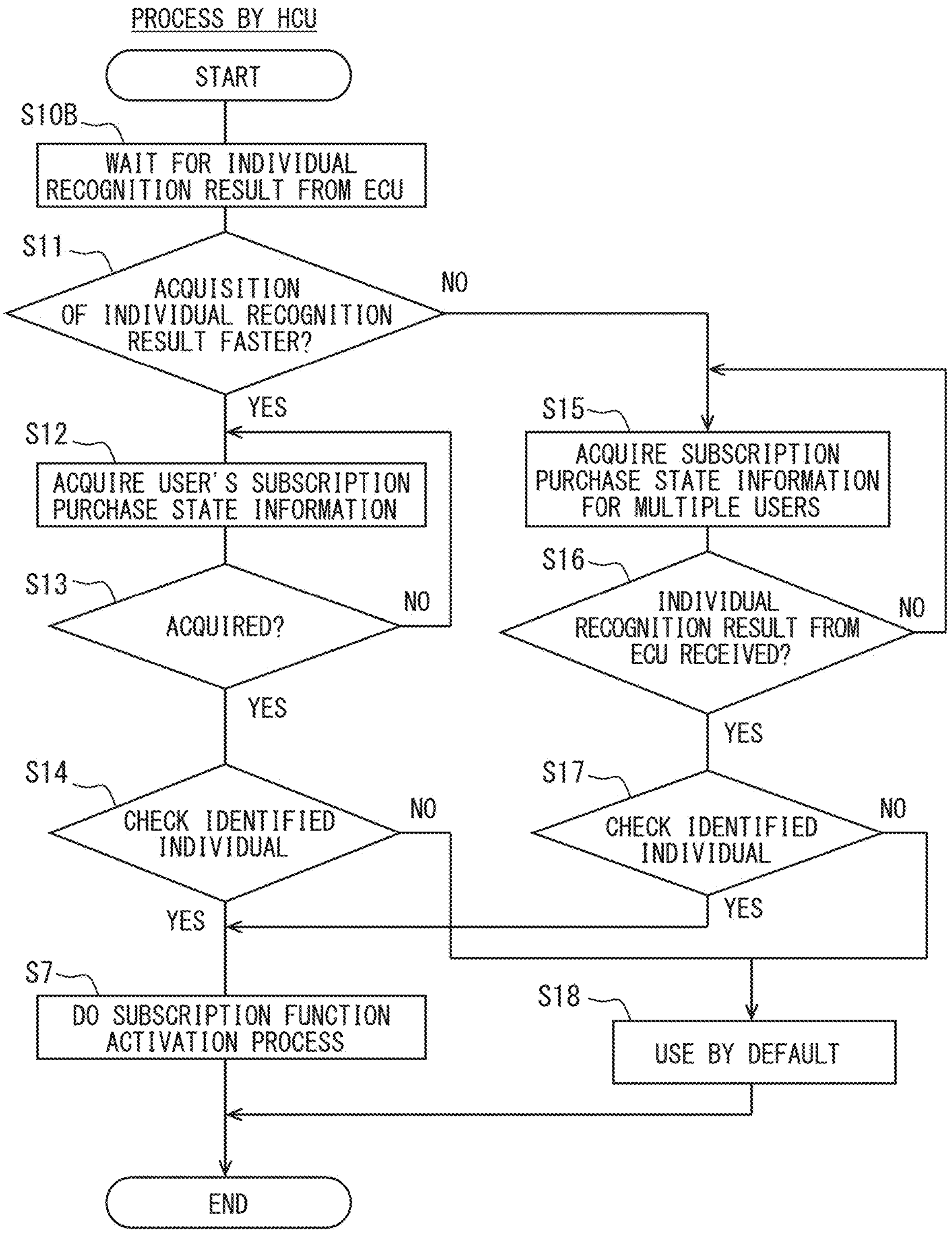
FIG. 4 is a flowchart schematically illustrating a third part of the process content in the vehicle.

For example, as shown in FIGS. 3 and 4, it is desirable for the HCU 3 and ECU 4 to execute their processing loads in parallel and change the processing content according to the delay situation in recognizing individuals, and to change and set the acquisition content of the subscription purchase state information to be acquired from the vehicle exterior management server 6.

First, as described above, when the user turns on the ignition or power switch, the HCU 3, the ECU 4, and the DCM 5, and the like are activated. After this, the ECU 4 activates the individual recognition function by the individual recognition unit 4*b* in S1 and recognizes the user seated in the seat of vehicle 2.

When the user is recognized by the individual recognition unit 4*b*, the ECU 4 acquires the recognition result of the individual in S2, and repeats this individual recognition process in S2 until the individual recognition result is successfully acquired in S3. At this time, the individual recognition process may be repeated several times in S2 and S3, for example, when the individual recognition unit 4*b* performs the check using the image recognition and the result indicates no matching with the preregistered user.

When the ECU 4 determines that the individual recognition result has been successfully acquired in S3, it transmits the result to the HCU 3 in S10A.

As shown in FIG. 4, the HCU 3 waits for the recognition result of the individual from the ECU 4 in S10B. However, the HCU 3 determines the delay situation acquired by recognizing the individual by the individual recognition unit 4*b* in S11 using the function of the delay determination unit 3*b*. That is, the HCU 3 determines whether the time is faster than the predetermined time to acquire the recognition result of the individual from the ECU 4. This method of determining whether the time is faster than the predetermined time may be performed by counting the time from the activation timing immediately after the activation of the vehicle 2. When the ECU 4 transmits, as information, a timing when the execution start timing of the individual recognition process after the activation of the vehicle 2, the time from this reception timing may be counted. Further, it may also use other time timing as a starting point to determine whether it is fast.

When the HCU 3 determines that it is faster than the predetermined time to acquire the authentication result of the individual in S11, it instructs the ECU 4 to acquire the subscription purchase state information of the user individual in S12. When the ECU 4 receives this acquisition instruction, the ECU 4 acquires the subscription purchase state information from the vehicle exterior management server 6 through the DCM 5 by the external information acquisition unit 4*c*. The ECU 4 forwards this subscription purchase state information to the HCU 3. The HCU 3 waits until the subscription purchase state information is acquired from the ECU 4 in S13, and when it is obtained, it judges YES in S13.

In S14, the HCU 3 checks the individual associated with the subscription purchase state information against the recognition result of the individual acquired beforehand from the ECU 4. When the check result is preferable, the determination result is YES in S14 and the HCU 3 processes the activation of the subscription function in S7. Thereby, the user is possible to enjoy the subscription services.

However, when the HCU3 determines in S11 that the timing of the acquisition of the individual authentication results is slower than predetermined timing, the HCU3 sets changes to the acquisition details of the subscription purchase state information to be acquired from the outside by the external information acquisition unit 4*c*. In this case, it is desirable to instruct the ECU 4 to acquire the subscription purchase state information of as many multiple users as possible in S15, instead of acquiring the subscription purchase state information of a single individual. The reason for this is that the acquisition of the authentication result of the individual becomes slow, so the aim is to acquire the subscription purchase state information of a plurality of users in advance, and to be able to check the individual and quickly authenticate the subscription function.

When the HCU3 instructs the ECU4 to acquire the subscription purchase state information of the plurality of users, the ECU4 acquires the subscription purchase state information of the plurality of users from the vehicle exterior management server 6. The ECU 4 successively transfers the user subscription purchase state information acquired from the vehicle exterior management server 6 to the HCU 3. The HCU3 can then receive the subscription purchase state information of the plurality of users in S16. When the HCU 3 determines that the recognition result of the individual has been received from the ECU 4 in S16, in S17, it checks the individual associated with the sequentially acquired subscription purchase state information with the recognition result of the individual determined to have been received in S16.

After checking the individual, the determination by the HCU 3 is YES in S17 when the checking result is preferable. The HCU 3 processes the activation of the subscription function in S7. However, when the HCU3 does not have the preferable checking result after checking the individual, it does not activate the subscription function and uses it by default in S18. In this case, for example, the user is not entitled to the subscription service but can use the vehicle instrument 30 normally.

(Summary of Present Embodiment)

According to the present embodiment, for example, even when the individual recognition is delayed, the amount of subscription purchase state information and the like to be acquired from the outside is changed and set according to the delay situation of the individual recognition. Therefore, the user is possible to use the subscription function of the vehicle instrument 30 as quickly as possible.

Also, when the delay has occurred in the individual recognition, the HCU 3 sets the subscription purchase state information acquired from the vehicle exterior management server 6 to the subscription purchase state information of a plurality of individuals. Thereby, it is possible to acquire the subscription purchase state information of a large number of individuals in advance. Then, when the individual is recognized by the individual recognition unit 4*b*, the HCU 3 can check the individual against the plurality of individuals acquired by the external information acquisition unit 4*c*, and the HCU 3 can set the subscription purchase state information for the appropriate individual from the plurality of individuals. Thereby, the user is possible to use the subscription function of the vehicle instrument 30 as quickly as possible, even when the individual recognition is delayed.

(Modifications)

In the above embodiment, in order to acquire as much subscription purchase state information as possible from the vehicle exterior management server 6, the subscription purchase state information of the plurality of individuals is acquired in parallel. However, the subscription purchase state information of at least one or more individuals may be acquired.

In other words, when the external information acquisition unit 4*c* acquires the subscription purchase state information of at least one or more individuals from the vehicle exterior management server 6 while the individual recognition unit 4*b* is recognizing the individual, the ECU 4 can acquire the subscription purchase state information in parallel while recognizing the individual. Therefore, it is possible to execute the process quickly even when only parallel processing is performed.

In this case also, when the individual is recognized by the individual recognition unit 4*b*, the individual is checked against the individual corresponding to the subscription purchase state information acquired from the outside. When the corresponding individual is matched, the setting unit 3*d* may perform the setting of the subscription purchase state information of the vehicle instrument 30 for the matched individual. Thereby, the user is possible to use the subscription function of the vehicle instrument 30 as quickly as possible, even when the individual recognition is delayed.

Second Embodiment

A second embodiment will be described with reference to FIGS. 5 to 7. For example, it may be possible to acquire the subscription purchase state information from the vehicle exterior management server 6. However, the ECU 4 for individual recognition may not be able to identify or recognize the individual with high reliability.

Therefore, in the present embodiment, when the specific reliability of the individual recognized by the individual recognition unit 4*b* is lower than the predetermined value, the HCU 3 recognizes the individual by another second recognition unit 3*f* different from the individual recognition unit 4*b*, The function as the setting unit 3*d* for setting the subscription purchase state information of the recognized individual vehicle instrument 30 is implemented from the subscription purchase state information acquired by the external information acquisition unit 4*c*. In the above-described embodiment, the form of executing the recognition process of the "second recognition unit 3*f*" by the HCU 3 is described. However, the process of the "second recognition unit 3*f*" may be executed by a different in-vehicle instrument, for example the ECU 4.

Figure 5:
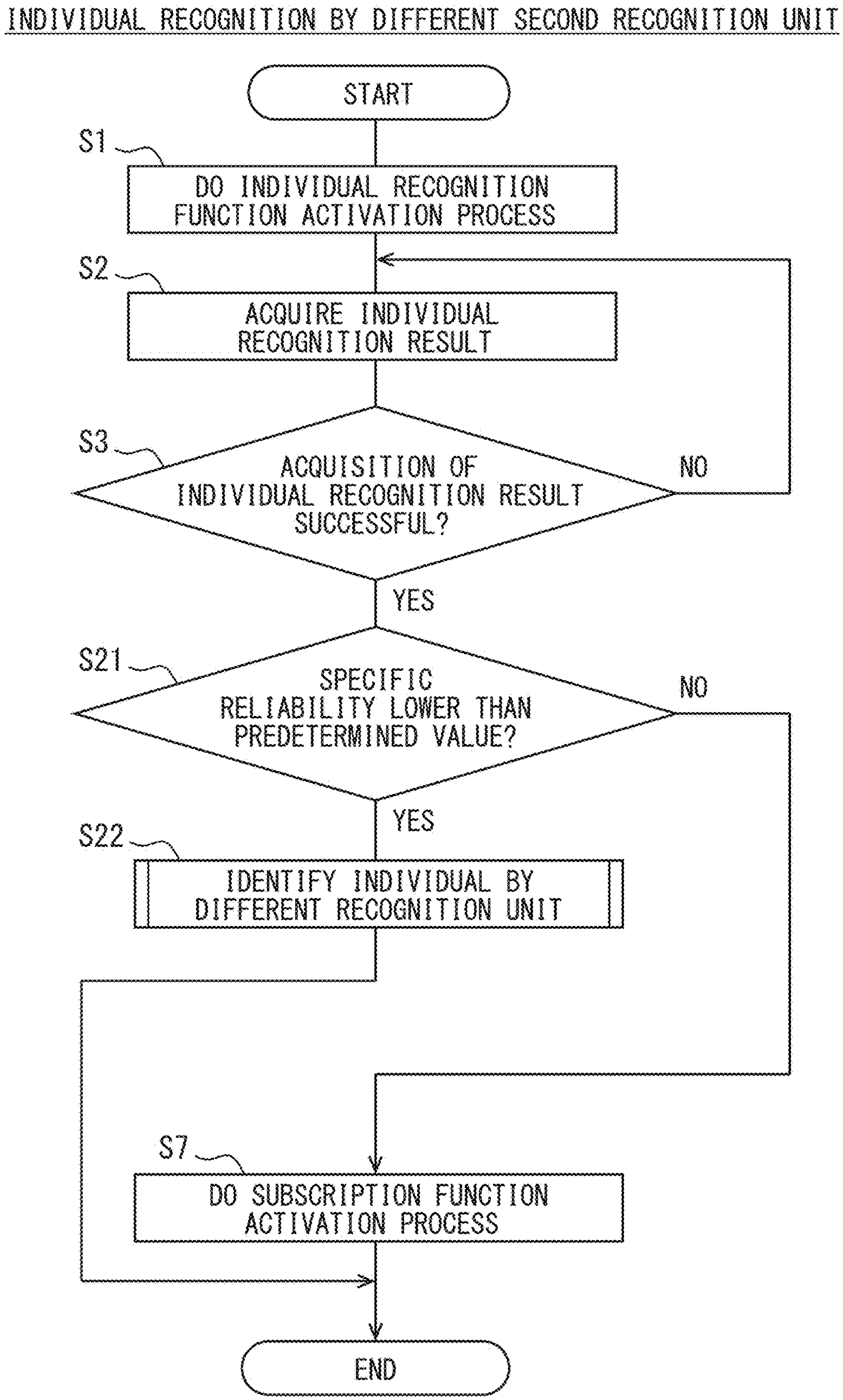
FIG. 5 is a flowchart schematically illustrating a first part of a process content in the vehicle according to a second embodiment.

As shown in FIG. 5, even when the processes of S1 to S3 described in the above-described embodiment are executed and the recognition result of the individual is acquired successfully, the specific reliability of the individual may be low. For example, the specific reliability level of the individual can be expressed as a percentage. When the ECU 4 checks the image recognition result of the driver face by the detection unit 10 against, for example, face data of the individual registered in advance, the specific reliability level changes based on the matching degree. Even when the HCU3 successfully acquires the recognition result of this individual, the HCU3 should use the second recognition unit 3*f* to recognize the individual when the specific reliability level is low.

The HCU 3 can evaluate the reliability level higher when it determines that the specific reliability level is not lower than the predetermined level as shown in S21 in FIG. 5. Therefore, the determination is NO in S21 and the HCU may activate the subscription function in S7. However, when the HCU 3 determines that the specific reliability level is lower than the predetermined level in S21 of FIG. 5, the HCU 3 executes a subscription function activation process in S7 on the condition that the second recognition unit 3*f* recognizes the individual and the reliability level of the specific recognition level is higher, as shown in S22 of FIG. 5 and an example of this in FIG. 6.

Figure 6:
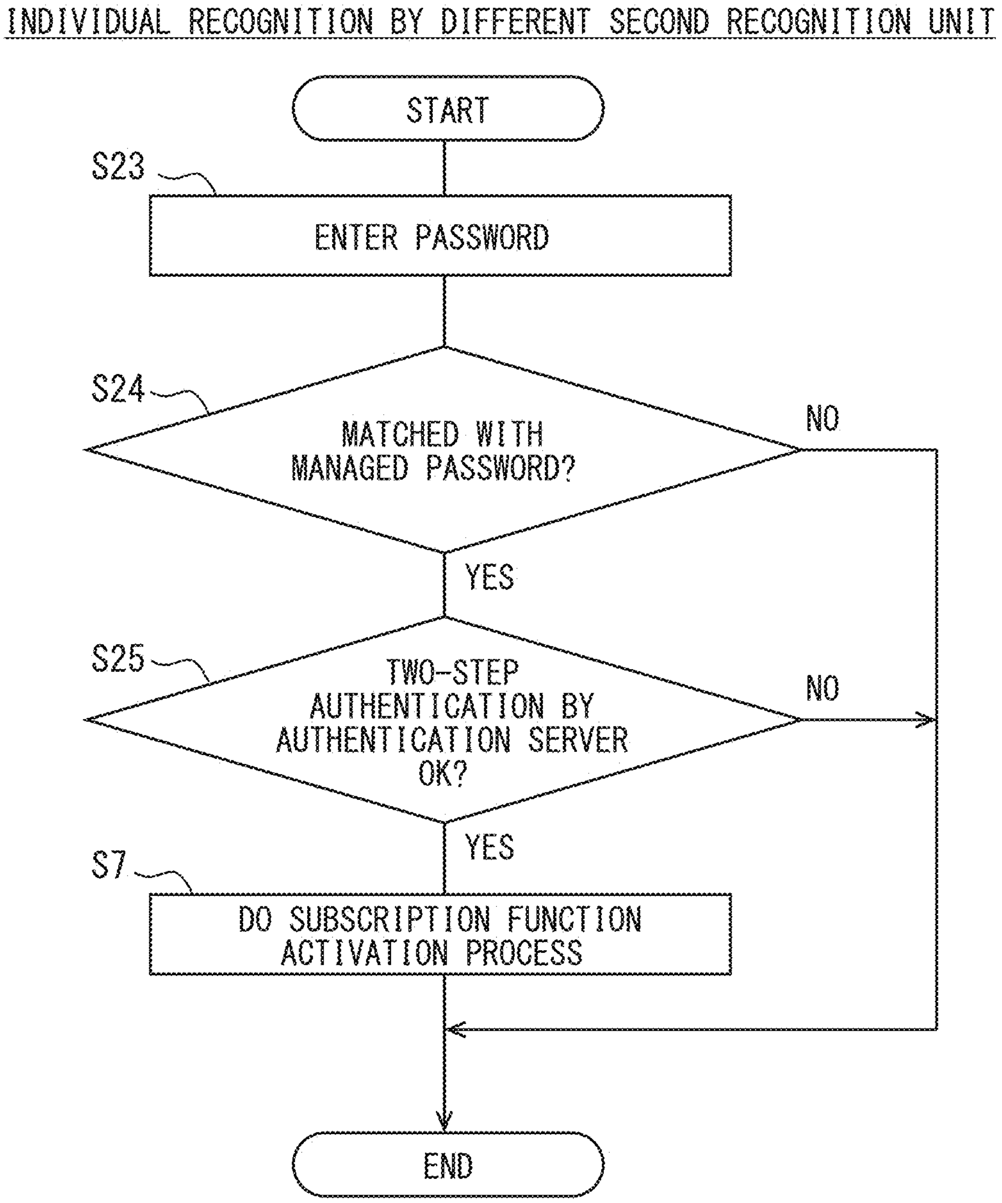
FIG. 6 is a flowchart schematically illustrating a second part of the process content in the vehicle.

As shown in FIG. 6, the HCU 3 causes the user to perform password authentication through the operation input interface in S23, and determines whether the password matches the password managed in the storage 3*a* in S24. When the passwords match, the determination by the HCU 3 is YES in S24, and the HCU 3 prompts a two-step authentication process with an authentication server 20 connected to the communication network 7.

The two-step authentication is performed, for example, by prompting the user to enter a separate code using an authentication application installed beforehand on the portable terminal 8 or an e-mail address, and then determining whether the authentication server 20 recognizes this input code as appropriate. When the authentication server 20 makes an appropriate (OK) determination, the determination is YES in S25 and the authentication server 20 activates the subscription function in S7. The user can then use the subscription function of the vehicle instrument 30.

Figure 7:
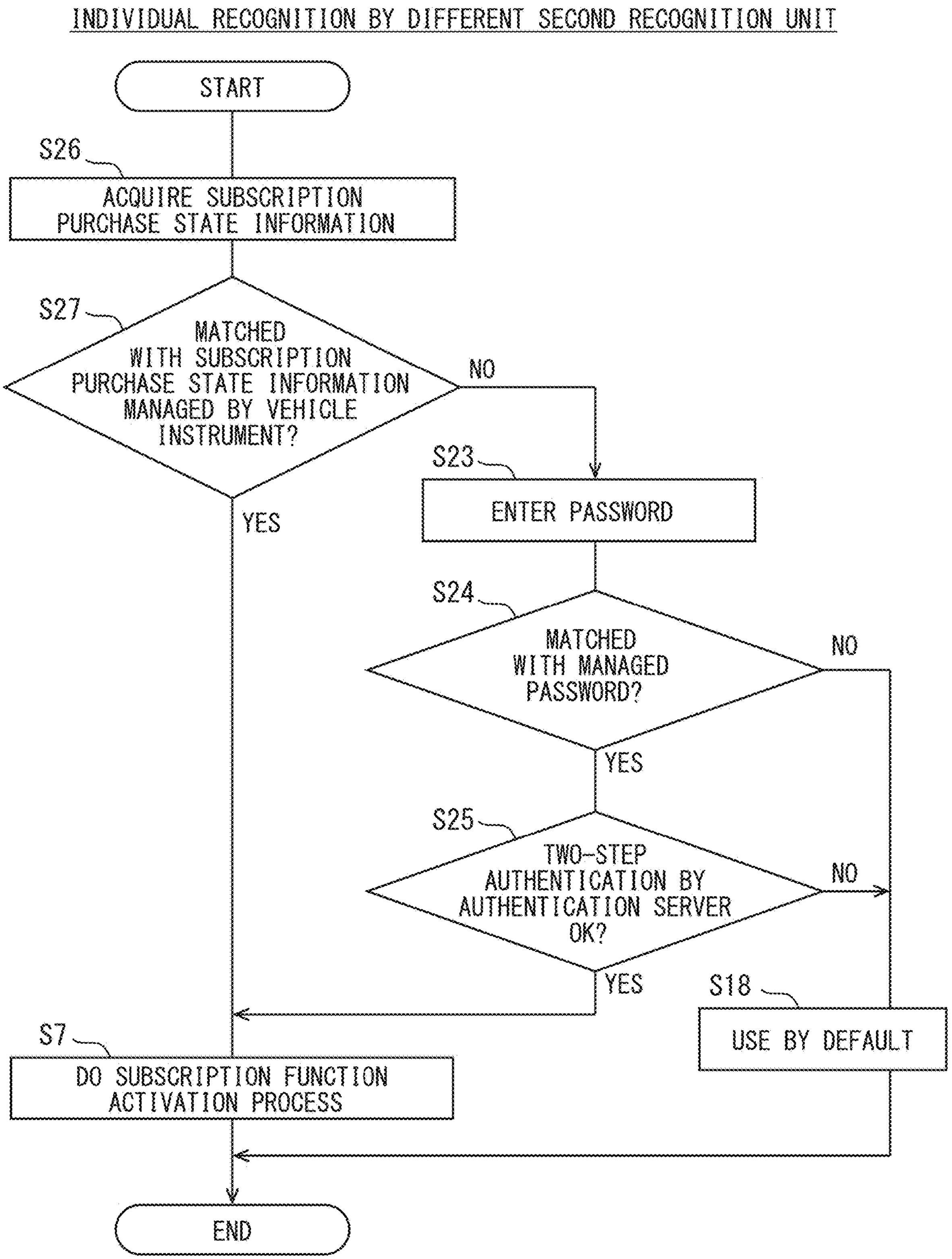
FIG. 7 is a flowchart schematically illustrating a third part of the process content in the vehicle.

Further, another example of the second recognition unit 3*f* is illustrated in FIG. 7. When the HCU3 determines that the specific reliability level is lower than the predetermined level in S21 of FIG. 5, the HCU3 executes a subscription function activation process in S7 on the condition that the second recognition unit 3*f* recognizes the individual and the reliability level of the specific recognition level is higher, as shown in S22 of FIG. 5 and an example of this in FIG. 7.

As shown in FIG. 7, the HCU 3 instructs the ECU 4 to acquire the subscription purchase state information and acquires the subscription purchase state information from the vehicle exterior management server 6 through the DCM 5. The HCU3 determines whether the information matches the subscription purchase state information managed in the storage 3*a* of the HCU3 that serves as the in-vehicle instrument. When the contents match, the HCU 3 activates the subscription function and processes the activation in S7. The user can then use the subscription function of the vehicle instrument 30.

However, when it is determined that they do not match in S27, the HCU3 causes the user to perform the password authentication through the operation input interface in S23, and determines whether the password matches the password managed in the storage 3*a* in S24. When the passwords match, the determination is YES in S24 and the HCU 3 prompts the two-step authentication process with the authentication server 20 connected to the communication network 7.

The two-step authentication is performed, for example, by prompting the user to enter a separate code using an authentication application installed beforehand on the portable terminal 8 or an e-mail address, and then determining whether the authentication server 20 recognizes this input code as appropriate. When the authentication server 20 makes an appropriate (OK) determination, the determination is YES in S25 and the authentication server 20 activates the subscription function in S7. The user can then use the subscription function of the vehicle instrument 30. Thereby, it is possible to ensure the accuracy of user authentication.

However, when the HCU3 does not acquire a preferable authentication result after additionally authenticating the individual in S24 and S25, the HCU3 does not activate the subscription function and uses it by default in S18. In this case, for example, the user is not entitled to the subscription service, but can use the vehicle instrument 30 normally.

As described above, according to the present embodiment, when the specified reliability of the individual recognized by the individual recognition unit 4*b* is lower than the predetermined value, the HCU 3 recognizes the individual by another second recognition unit 3*f* different from the individual recognition unit 4*b*. The subscription purchase state information of the recognized individual vehicle instrument 30 is set. Thereby, it is possible to perform the authentication with the preferable reliability even when the reliability of the individual authentication by the individual recognition unit 4*b* is lower than a predetermined value. It is possible to set the individual subscription purchase state information related to the vehicle instrument 30. Thereby, the user is possible to quickly enjoy the subscription function of the vehicle instrument 30 to which the subscription service is applied.

Third Embodiment

Figure 8:
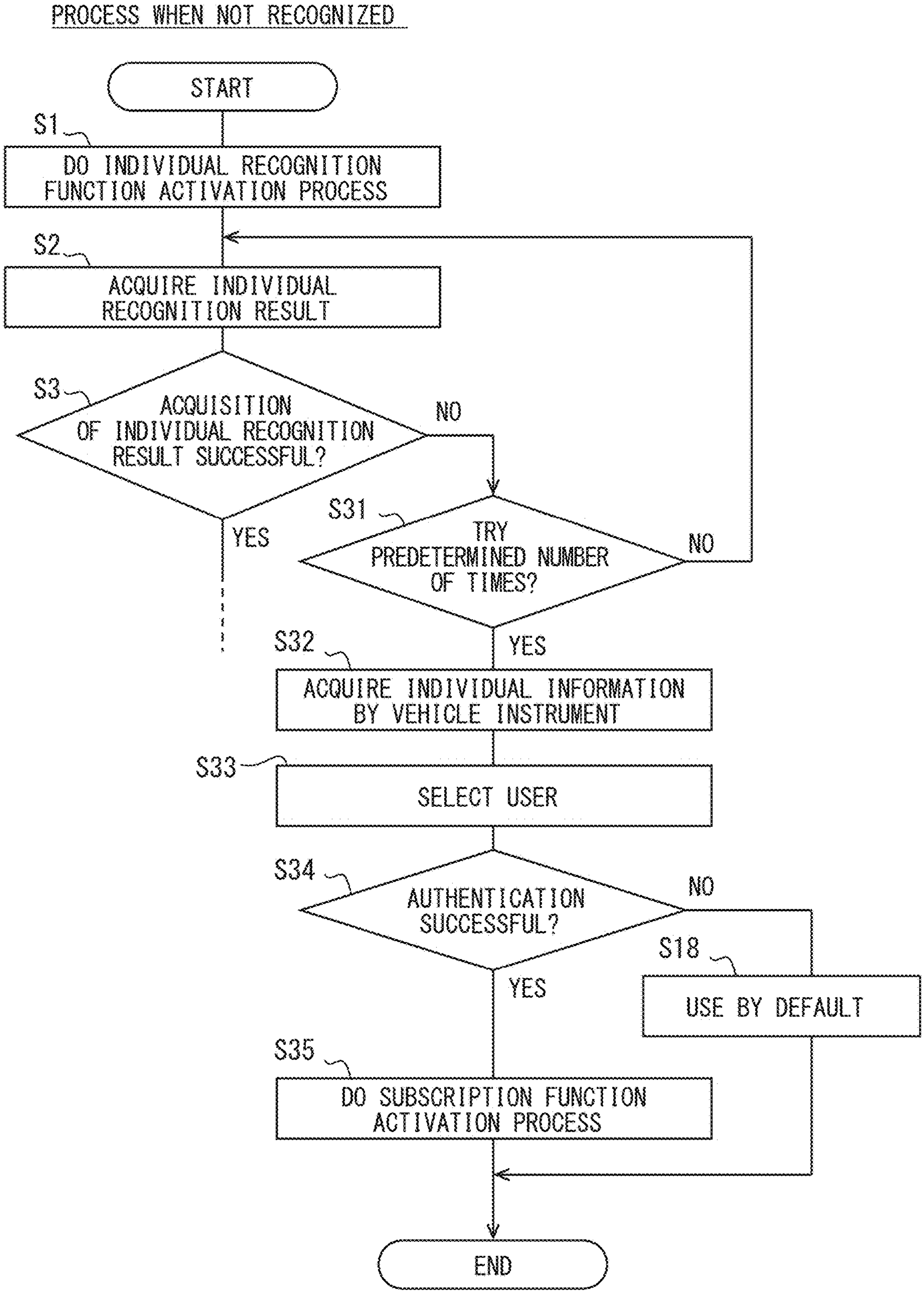
FIG. 8 is a flowchart schematically illustrating a process content in the vehicle according to a third embodiment.

The following describes a third embodiment with reference to FIG. 8. For example, it may be possible to acquire the subscription purchase state information from the vehicle exterior management server 6, but the ECU 4 for individual recognition may not be able to recognize the individual. When the ECU 4 cannot identify an individual by the individual recognition unit 4*b*, it is inconvenient because the ECU 4 cannot identify who the vehicle user is and the user may not be able to use the subscription service in the vehicle 2.

Therefore, in the present embodiment, instead of the recognition process of the "second recognition unit 3*f*" shown in the second embodiment, the second recognition unit 3*f* implements a function to identify an individual by obtaining personal information stored and managed in the storage 3*a* of the in-vehicle instrument, here, the HCU3.

When the user boards the vehicle 2, the portable terminal 8 pairs with the short-range wireless communication unit 11 in the vehicle 2 to enable information communication. At this time, the portable terminal 8 pairs with the short-range wireless communication unit 11 in the vehicle 2 through the short-range wireless communication unit 8*b*, so that the HCU 3 can acquire identification information.

The HCU 3 can store and retain pairing information, such as unique identification information for the portable terminal 8 and user information, in the storage 3*a* as identification information. The identification information that identifies the portable terminal 8 and the user who possesses the portable terminal 8 is stored in the storage 3*a* in association with the user.

As shown in FIG. 8, in a case where the HCU 3 determines whether the recognition result of an individual has been successfully acquired in S1 to S3, when the acquisition is not successful, the determination is NO in S3 and the HCU 3 repeats the process of acquiring the recognition result of the individual in S2. In the present embodiment, the HCU3 considers the case where the HCU 3 cannot succeed in acquiring the recognition result of an individual even after trying the process of acquiring the results a predetermined number of times in S31. In this case, the determination is YES in S31 and the process shifts to S32.

In S32, the HCU 3 acquires the identification information stored and managed in the storage 3*a* in the in-vehicle instrument, in this case in the HCU 3. The identification information here indicates the unique identification information of the portable terminal 8 included in the pairing information described above or the identification information of the user who possesses the portable terminal 8.

When the identification information acquired from the portable terminal 8 includes more than one individual, the HCU 3 authenticates the user by causing the person in the vehicle 2 to select the user via the operation input interface in S33. This authentication process can use password authentication or two-step authentication, as described in the above-described embodiment.

When the authentication is successful in S34, the determination is YES in S34 and the HCU 3 processes the activation of the subscription function in S35. The user can use the subscription function of the vehicle instrument 30.

However, in a case where the user is selected by the person in the vehicle 2, when the authentication is not successful, the HCU 3 will only allow the use of the vehicle instrument 30 by default in S18, without the activation process of the subscribe function. In this case, for example, the user is not entitled to the subscription service, but can use the vehicle instrument 30 normally.

According to the present embodiment, the identification information of the user managed in the HCU 3 mounted on the vehicle 2 is acquired by the function of the second recognition unit 3*f* so as to recognize the individual. Therefore, it is possible to secure the user authentication. Even when the ECU 4 for individual recognition cannot recognize an individual, the user is possible to quickly use the subscription function.

Fourth Embodiment

Figure 9:
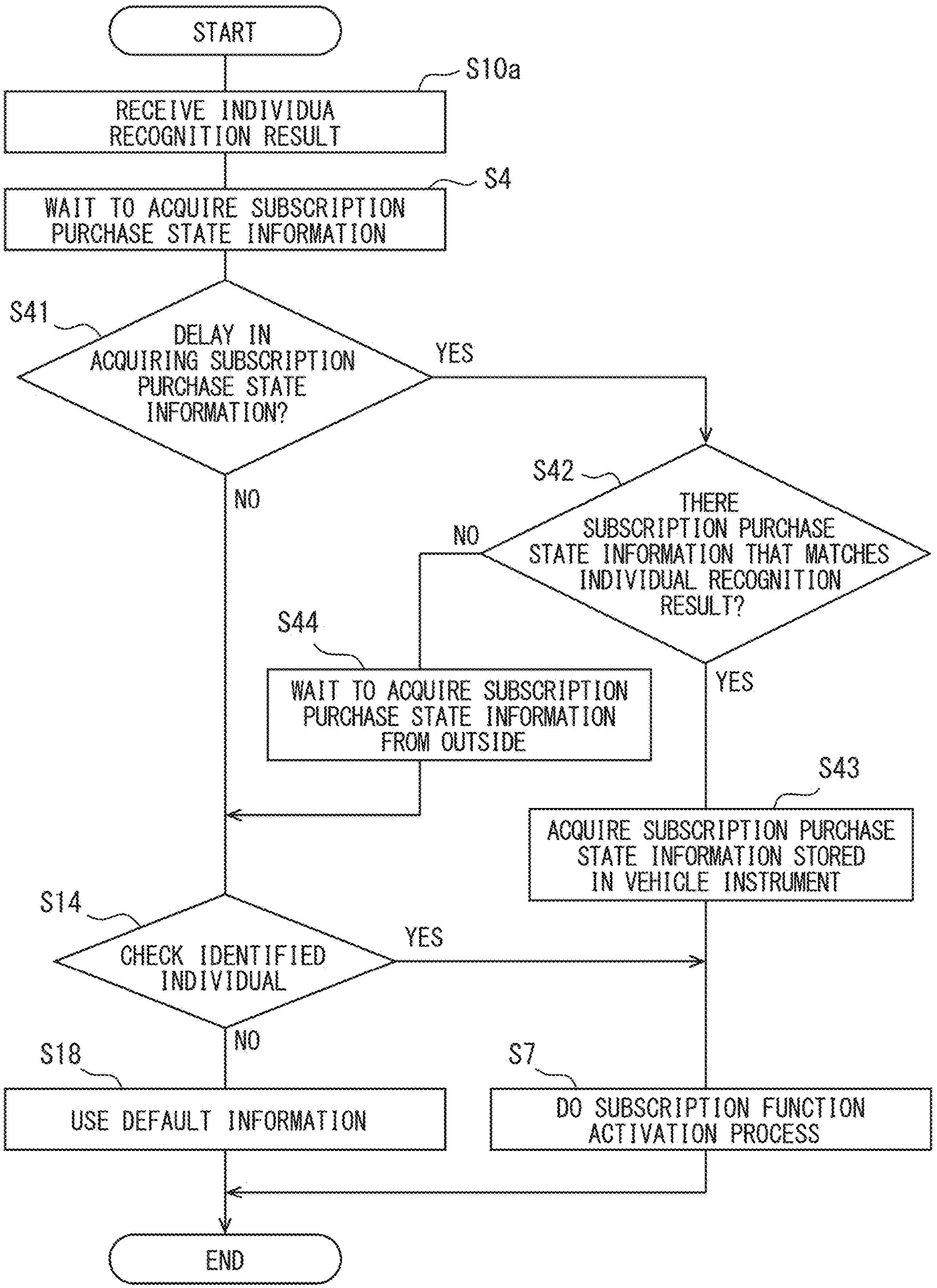
FIG. 9 is a flowchart schematically illustrating a process content in the vehicle according to a fourth embodiment.

The following describes a fourth embodiment with reference to FIG. 9. For example, the communication environment through the communication network 7 is deteriorating, and the user may not be able to use the subscription service in the vehicle 2, such as the DCM 5 cannot communicate with the vehicle exterior management server 6. Such a situation is inconvenience for the user.

Therefore, in the present embodiment, the HCU 3 implements its function as the setting unit 3*d* that reads and sets the individual subscription purchase state information stored in the storage 3*a* in the vehicle 2 until the individual subscription purchase state information stored outside the vehicle 2 is retrieved.

As shown in FIG. 3 described in the first embodiment, the ECU 4 for individual recognition executes the processes from S1 to S3. When the acquisition of the recognition result of an individual is successful, the determination is YES in S3 and this result is transmitted to the HCU 3. As shown in FIG. 9, when the HCU 3 receives the recognition result of the individual transmitted from the ECU 4 in S10*a*, the HCU 3 waits to acquire the user subscription purchase state information transmitted from the ECU 4 in S4.

The HCU 3 then determines the acquisition state of the subscription purchase state information in S41, and determines whether it is delayed compared to normal, or in this case, whether it is delayed more than a predetermined value. The method of determining whether the delay is longer than the specific time may be performed by counting the time from the activation timing immediately after the activation of the vehicle 2, or by counting the time from the reception timing when the ECU 4 transmits a timing to start acquiring the subscription purchase state information from the vehicle exterior management server 6 after the activation of the vehicle 2. It may also use other time timing as a starting point to determine whether the delay has occurred.

When the HCU 3 does not experience the delay in acquiring the subscription purchase state information and is able to acquire the subscription purchase state information promptly, the determination is NO in S41 and the HCU 3 executes the process in S14 as shown in the above-described embodiment. In S14, the HCU3 checks the individual associated with the subscription purchase state information against the recognition result of the individual acquired beforehand from ECU4. When the check result is preferable, the determination result is YES in S14 and processes the activation of the subscription function in S7. Thereby, the user is possible to quickly enjoy the subscription function of the vehicle instrument 30 to which the subscription service is applied.

However, the determination by the HCU 3 is YES in S41 when the delay has occurred in acquiring the subscription purchase state information. At this time, the HCU 3 determines whether the subscription purchase state information matching the individual recognition result is stored and retained in the storage 3*a* in S42, and acquires the subscription purchase state information stored in the storage 3*a* of the HCU 3. Thereafter, the HCU 3 activates the subscription function in S7. Thereby, the user is possible to quickly enjoy the subscription function of the vehicle instrument 30.

Here, the HCU 3 uses the default information in S18 without the activation process of the subscription function when the individual could not be matched in S14. In this case, for example, the user would not be able to receive the subscription service, but would be able to use the vehicle instrument 30 normally.

On the other hand, when the subscription purchase state information matching the recognition result of the individual cannot be acquired from the storage 3*a* in S42, the determination is NO in S42. The HCU 3 waits until the subscription purchase state information can be acquired from the vehicle exterior management server 6 through the DCM 5 and the ECU 4 in S44. Then, when the HCU 3 acquires the subscription purchase state information from the ECU 4 in S44, the process shifts to S14 and the HCU 3 repeats the same check process as described above. When this check result is preferable, the subscription function is activated in S7. When the result is not preferable, the default information is used in S18, and the subscription function is not used.

The present embodiment can be summarized as follows. In the present embodiment, until the individual subscription purchase state information stored in the vehicle exterior management server 6 outside the vehicle 2 is retrieved, the setting unit 3*d* acquires and sets the individual subscription purchase state information stored in the storage 3*a* inside the vehicle 2. Therefore, the activation of the subscription function becomes possible using the subscription purchase state information of the individual vehicle instrument 30 stored in the storage 3*a*.

Thereby, billing information stored in the database 9 of the vehicle exterior management server 6 and the expiration date information stored in the storage 3*a* of the HCU 3 of the vehicle 2 can be used appropriately. The expiration date information contained in the subscription purchase state information stored in the storage 3*a* of the HCU 3 can be effectively used. Thereby, even when the subscription purchase state information cannot be acquired from the vehicle exterior management server 6, the user is possible to use the subscription function as quickly as possible.

Other Embodiments

The present disclosure is not limited to the embodiments described above, but can be implemented by various modifications, and can be applied to various embodiments without departing from the spirit of the present disclosure.

In the above-described embodiments, the HCU3 mainly executes the processes, but some or all of the processes and functions may be executed by another in-vehicle instrument (for example, ECU 4). Conversely, the functions of the ECU 4 can be performed by other in-vehicle instruments (for example, HCU 3).

In the drawings, the reference numeral of 1 indicates a vehicle personalization setting system, the reference numeral of 3 indicates an HCU (in-vehicle instrument), the reference numeral of 3*b* indicates a delay determination unit, the reference numeral of 3*c* indicates a change setting unit, the reference numeral of 3*d* indicates a setting unit, the reference numeral of 3*e* indicates an operation input unit, the reference numeral of 3*f* indicates a second recognition unit, the reference numeral of 4 indicates an ECU (in-vehicle instrument), the reference numeral of 4*b* indicates an individual recognition unit, the reference numeral of 4*c* indicates an external information acquisition unit, and the reference numeral of 20 indicates an authentication server.

The method executed by the HCU 3 or the different ECU 4 described in the present disclosure may be implemented by a dedicated computer including a memory and a processor programmed to execute one or more functions implemented by a computer program. Alternatively, the method by the HCU 3 or the ECU 4 described in the present disclosure may be implemented by a dedicated computer configured by a processor including one or more dedicated hardware logic circuits. Alternatively, the control device and the method according to the present disclosure may be implemented using one or more dedicated computers including a combination of the processor and the memory programmed to execute one or more functions and the processor with one or more hardware logic circuits. Further, the computer program may be stored, as instructions to be executed by a computer, in a computer-readable non-transitory tangible storage medium.

The present disclosure has been described in accordance with the embodiments. However, it is to be understood that the present disclosure is not limited to the embodiments and configurations described above. The present disclosure includes various modification examples and equivalents thereof. In addition, various combinations and modes, as well as other combinations and modes including only one element, more, or less, are within the scope and idea of the present disclosure.

What is claimed is:

1. A vehicle personalization setting system that sets personalization setting information for at least one vehicle instrument for each of at least one individual recognized by an individual recognition unit, the system comprising:

an external information acquisition unit configured to acquire, from an outside of a vehicle, the personalization setting information of the at least one vehicle instrument for each individual, the information being stored in an outside based on an individual recognized by the individual recognition unit;

a storage that stores the personalization setting information of the at least one vehicle instrument mounted in the vehicle, wherein the personalization setting information was previously set; and a setting unit configured to read and set the personalization setting information stored in the storage in the vehicle, until the personalization setting information stored in the outside of the vehicle is acquired, wherein the personalization setting information stored in the outside of the vehicle is external information, the personalization setting information stored in the storage in the vehicle is internal information, the setting unit determines whether a delay of an acquisition time of the external information of the at least one vehicle instrument of the at least one individual has occurred as compared with a predetermined time, and when determining that the delay has occurred, the setting unit reads and sets the internal information of the at least one vehicle instrument of the at least one individual until the external information acquisition unit acquires the external information stored in the outside.

2. The vehicle personalization setting system according to claim 1, wherein when communicating with the outside of the vehicle, the setting unit determines whether the delay has occurred by counting a time from a timing to start acquiring the personalization setting information from the outside of the vehicle.

3. A vehicle personalization setting method that sets personalization setting information for at least one vehicle instrument for each of at least one individual recognized by an individual recognition unit, the method comprising:

causing the individual recognition unit to recognize the at least one individual;

acquiring, from an outside of the vehicle, the personalization setting information of the at least one vehicle instrument for each individual, the information being stored in the outside based on the recognized individual; and reading and setting the personalization setting information of the at least one vehicle instrument of the at least one individual from a storage that is mounted in the vehicle and storing the personalization setting information until the personalization setting information stored in the outside of the vehicle is acquired, wherein the personalization setting information stored in the storage was previously set, the personalization setting information stored in the outside of the vehicle is external information, the personalization setting information stored in the storage in the vehicle is internal information, and the method further comprises:

determining whether a delay of an acquisition time of the external information of the at least one vehicle instrument of the at least one individual has occurred as compared with a predetermined time; and when determining that the delay has occurred, reading and setting the internal information of the at least one vehicle instrument of the at least one individual until acquiring the external information stored in the outside.

4. The vehicle personalization setting method according to claim 3, wherein when communicating with the outside of the vehicle, the method further comprises determining whether the delay has occurred by counting a time from a timing to start acquiring the personalization setting information from the outside of the vehicle.

5. A vehicle personalization setting system that sets personalization setting information for at least one vehicle instrument for each of at least one individual recognized by an individual recognition unit including a first processor, the system comprising:

a second processor; and a memory coupled to the second processor and storing program instructions that when executed by the second processor cause the second processor to;

acquire, from an outside of a vehicle, the personalization setting information of the at least one vehicle instrument for each individual, the information being stored in an outside based on an individual recognized by the individual recognition unit;

store the personalization setting information of the at least one vehicle instrument mounted in the vehicle, wherein the personalization setting information was previously set; and read and set the personalization setting information stored in the vehicle, until the personalization setting information stored in the outside of the vehicle is acquired, wherein the personalization setting information stored in the outside of the vehicle is external information, the personalization setting information stored in the storage in the vehicle is internal information, and the second processor is further caused to:

determine whether a delay of an acquisition time of the external information of the at least one vehicle instrument of the at least one individual has occurred as compared with a predetermined time; and when determining that the delay has occurred, read and set the internal information of the at least one vehicle instrument of the at least one individual until acquiring the external information stored in the outside.

6. The vehicle personalization setting system according to claim 5, wherein when communicating with the outside of the vehicle, the second processor determines whether the delay has occurred by counting a time from a timing to start acquiring the personalization setting information from the outside of the vehicle.

* * * * *